US008162214B1

(12) United States Patent
Malatesta et al.

(10) Patent No.: US 8,162,214 B1
(45) Date of Patent: Apr. 24, 2012

(54) BALLOT PROCESSING METHOD AND APPARATUS

(75) Inventors: James Malatesta, Hockessin, DE (US); Edward Cohen, Mount Laurel, NJ (US)

(73) Assignee: Tritek Technologies, Inc., Wilmington, DE (US)

( * ) Notice: Subject to any disclaimer, the term of this patent is extended or adjusted under 35 U.S.C. 154(b) by 342 days.

(21) Appl. No.: 12/174,127

(22) Filed: Jul. 16, 2008

Related U.S. Application Data

(60) Provisional application No. 60/950,132, filed on Jul. 17, 2007.

(51) Int. Cl.
*G06K 17/00* (2006.01)
*G07C 13/00* (2006.01)

(52) U.S. Cl. ............. 235/386; 235/375; 235/51; 705/12

(58) Field of Classification Search .................... 235/51, 235/375, 386; 705/12
See application file for complete search history.

(56) References Cited

U.S. PATENT DOCUMENTS

| | | | | |
|---|---|---|---|---|
| 3,073,445 A | | 1/1963 | Holt, Jr. | |
| 3,136,424 A | | 6/1964 | Silverschotz | |
| 4,250,806 A | | 2/1981 | Boyson | |
| 4,479,194 A | * | 10/1984 | Fogg et al. | 235/386 |
| 5,055,946 A | | 10/1991 | Kurahashi | |
| 5,226,547 A | | 7/1993 | Malatesta et al. | |
| 5,372,238 A | * | 12/1994 | Bonnet | 198/455 |
| 5,398,922 A | | 3/1995 | Malatesta et al. | |
| 5,521,365 A | | 5/1996 | Malatesta et al. | |
| 5,544,758 A | | 8/1996 | Malatesta et al. | |
| 5,649,026 A | | 7/1997 | Heins, III | |
| 5,875,432 A | | 2/1999 | Sehr | |
| 5,878,399 A | | 3/1999 | Peralto | |
| 6,189,784 B1 | * | 2/2001 | Williams et al. | 235/375 |
| 6,540,138 B2 | | 4/2003 | Hall | |
| 6,695,216 B2 | | 2/2004 | Apperson | |
| 6,779,727 B2 | | 8/2004 | Warther | |
| 6,892,944 B2 | | 5/2005 | Chung | |
| 7,032,821 B2 | | 4/2006 | McClure | |
| 7,054,829 B2 | | 5/2006 | Campo | |
| 7,077,313 B2 | | 7/2006 | Chung | |
| 7,077,314 B2 | | 7/2006 | Johnson | |
| 7,111,782 B2 | | 9/2006 | Homewood | |
| 7,136,504 B2 | | 11/2006 | Hansel | |
| 7,178,730 B1 | | 2/2007 | Jamison | |
| 7,216,807 B2 | | 5/2007 | McClure | |
| 7,240,835 B2 | | 7/2007 | Brucker | |
| 7,467,747 B2 | * | 12/2008 | Haas et al. | 235/491 |
| 2002/0069187 A1 | * | 6/2002 | Barnum et al. | 705/408 |
| 2002/0087394 A1 | | 7/2002 | Zhang | |
| 2003/0138135 A1 | | 7/2003 | Chung | |

(Continued)

OTHER PUBLICATIONS

Wei, Zong; Huijing Zhou, Method of locating address blocks in parcel post images based on edge detection, Computer Measurement & Control, vol. 12, No. 10, pp. 911-913, Magazine Agency of Comput. Measurement & Control, Oct. 2004. Abstract Only.

(Continued)

*Primary Examiner* — Ali Sharifzada
(74) *Attorney, Agent, or Firm* — Schnader Harrison Segal & Lewis LLP

(57) ABSTRACT

An automated system and method for processing vote-by-mail ballots. The method comprises electronically evaluating the ballots for validity and sorting them according to sort parameters and sort plan. Included in the invention is an apparatus, computer readable medium, and computer system for carrying out the ballot processing method.

24 Claims, 4 Drawing Sheets

U.S. PATENT DOCUMENTS

| | | | | |
|---|---|---|---|---|
| 2004/0024716 | A1* | 2/2004 | Malatesta et al. | 705/410 |
| 2004/0088268 | A1* | 5/2004 | Mayes | 705/407 |
| 2004/0149825 | A1 | 8/2004 | Griffin | |
| 2005/0133584 | A1* | 6/2005 | Finnerty et al. | 235/375 |
| 2005/0218224 | A1 | 10/2005 | Boldin | |
| 2006/0049252 | A1* | 3/2006 | Guyett et al. | 235/386 |
| 2006/0060649 | A1* | 3/2006 | Brucker et al. | 235/386 |
| 2007/0007341 | A1 | 1/2007 | Poulin | |
| 2007/0170253 | A1 | 7/2007 | Chung | |
| 2008/0116256 | A1* | 5/2008 | Martin et al. | 235/375 |
| 2008/0173714 | A1* | 7/2008 | Kite et al. | 235/386 |

OTHER PUBLICATIONS

Ikeda O; Kaneko I; Tamura Y; Ogaway T; Mitsutake T; Ohtaka H, New mail processing system for the Ministry of Posts and telecommunications: Special issue on postal automation technology, NEC Research & Development, 1999. vol. 40. No. 2. pp. 137-141. Abstract Only.

* cited by examiner

BALLOT PROCESSING METHOD AND APPARATUS

PRIOR APPLICATIONS

This application is based on, and claims priority to, U.S. provisional application Ser. No. 60/950,132, filed Jul. 17, 2007, and entitled Ballot Processing Machine.

FIELD OF THE INVENTION

The invention relates to automated systems for document and information processing, and in particular to voting ballot processing machines.

BACKGROUND OF THE INVENTION

Processing vote-by-mail ballots (also referred to as "absentee ballots") is normally a manual process. Due to the nature of voting, the volume of ballots to be processed on a given day varies dramatically from zero ballots between elections to thousands or millions of ballots per day during peak election times. Manually processing is slow and typically requires large number of temporary workers to be brought in and trained for peak election times. Many preliminary tasks such as determining whether the ballot is valid, has a signature and whether the ballot envelope contains all necessary documents, must be done by a single individual or passed to a number of individuals to complete the process. If a single individual checks for all aspects of ballot validity, certain ones may be missed. Furthermore, it is necessary to open the ballot envelopes to determine whether they contain all necessary documents if the process is performed manually.

Manual sorting of ballots, such as by precinct, can be very time consuming and easily subject to human error.

Keeping records of manually sorted ballots can also be problematic, because of time needed and possibility of errors when entering significant amounts of data. It is advantageous to create detailed reports of the actions taken on each ballot, such as information read from the ballot, what information was verified, which bin the ballot was placed into, which batch the ballot was placed into, and where images of the ballot and/or signature, if any are located, etc. However, it can be nearly impossible to keep these records, or keep them with the desired accuracy. As has been seen in some recent elections, it is imperative that ballots are processed accurately, all valid ballots are processed, and all invalid ballots rejected. Accordingly, as manual ballot processing methods are slow, prone to errors, create opportunities for fraud, require more people, and delay reporting of election results due to slower processing times, there is a need for an improved system.

SUMMARY OF THE INVENTION

Embodiments of the invention provide a method of processing vote-by-mail ballots. As used herein "ballot" may be a single item or a ballot envelope containing one or more items. Typically, vote-by-mail ballots comprise an envelope having a ballot and possibly other materials contained inside. The ballot envelopes are processed first, including determining which may be valid, and then sorting them according to a sort plan, such as by precinct. The envelopes can then be opened and the votes tallied. A vote-by-mail ballot does not necessarily have to be comprised of an envelope with enclosed contents. It could also be, for example, a single folder piece of paper, or be of another suitable configuration. Accordingly, the phrase "ballot envelope" or the term "envelope" is used herein to include an envelope, or a document otherwise configured to be mailed, such as a folded piece of paper.

Illustrative embodiments of the invention can also be applied to applications other than ballot processing. In an exemplary embodiment of the invention an apparatus first detects the ballots, checks the dimensions of the ballots, and then prints an audit trail if the dimensions are acceptable. If the dimensions are not acceptable, the apparatus can reject those ballots and direct them to a rejection bin or process them in a manner to be flagged as "rejected". Images of the non-rejected ballots are then captured and stored. In additional embodiments images may also be taken of rejected ballots. Criteria present in the image are then evaluated. These criteria may include, for example, identifier information, election number, and presence of a signature. Ballots are rejected if the criteria are not valid. If the criteria are valid, a sorting parameter is determined. Ballots are then sent to an appropriate bin based on the sorting parameter and a sort plan. The ballots are included in batches that can be comprised of one or more bins. Information can then be added about ballots into the audit trail that includes the batch and bin number.

The invention includes apparatuses for ballot processing and the method(s) carried out by the apparatuses. The invention also includes a computer readable medium programmed to carry out the inventive methods and a computer system configured to carry out those methods.

DESCRIPTION OF THE DRAWINGS

The invention is best understood from the following detailed description when read with the accompanying drawings.

DETAILED DESCRIPTION OF THE INVENTION

Figure 1:
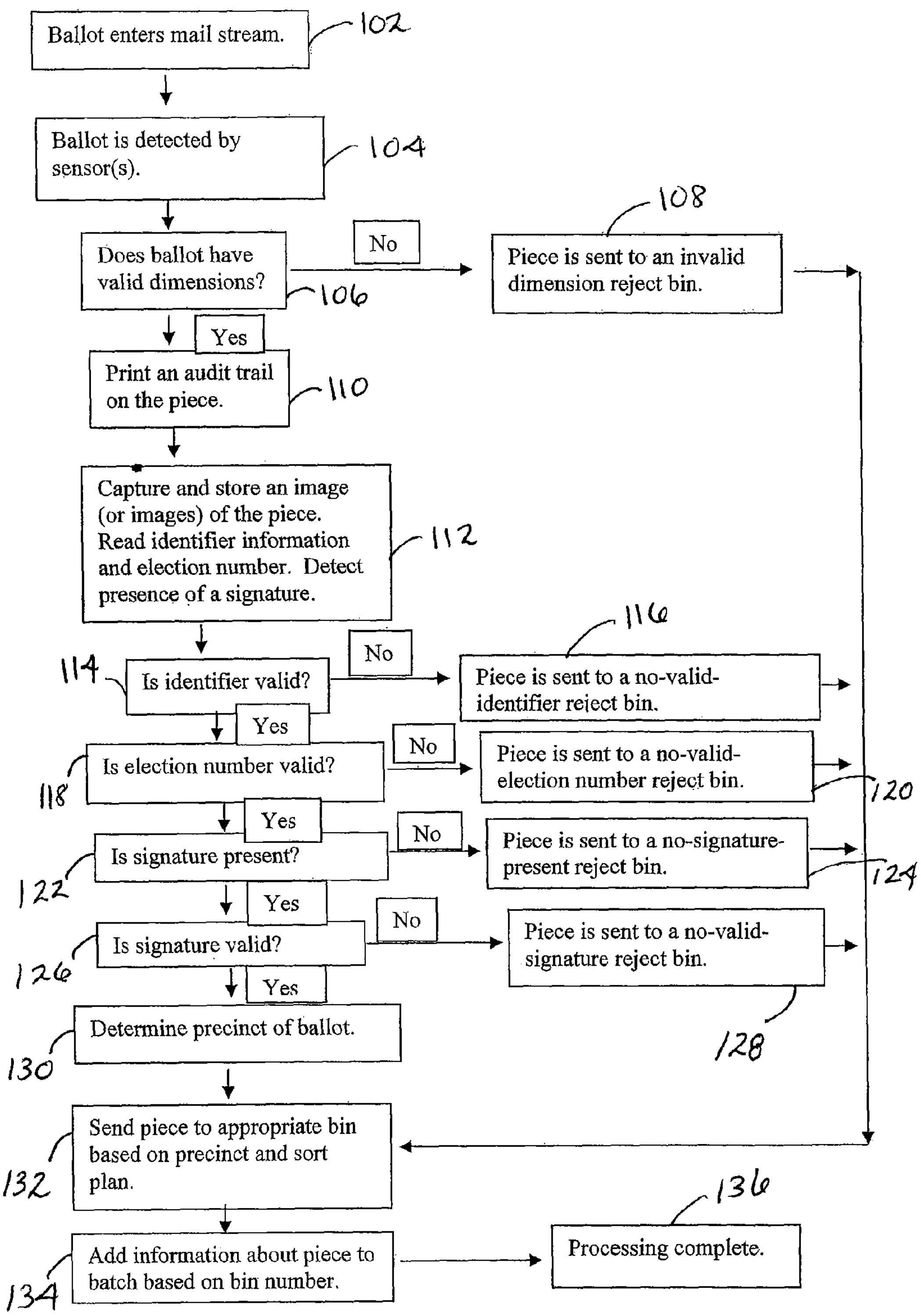
FIG. 1 is a flow chart of ballot processing first pass for a single ballot traveling down the machine according to an illustrative embodiment of the invention.

Compared to manual sortation, automated processing is much quicker, allows for easier accountability (tracking of each piece or item), reduction of people required, and reduction of people touching the ballots (which reduces security risks).

In an illustrative embodiment of the invention, the sorting machine passes the ballots in an automated manner at a rate of approximately 10,000 ballots per hour. Faster processing speeds are achievable by adding additional processors (i.e., computers). In the preferred embodiment, the ballots are placed into the feeder section in a stack. Preferably the pieces are placed on a conveyor in an upright orientation (meaning an angle close to perpendicular or closer to perpendicular than horizontal, to the conveyor belt). However, other angles and stacking orientations are within the scope of this invention. The ballots are singulated (separated individually from the stack) and sent into the ballot-processing path. The processing path consists of a set of modules. In the preferred embodiment, the ballot is first processed by a printing module that prints a unique audit trail (consisting of one or more of the following: characters, barcodes, or other symbols). The audit trail printed on each ballot will be unique. A unique audit trail is one that is unique for the group of pieces for the time usage period. For example, if the audit trail was started at zero and incremented, each number would be unique. However, since space limitations on printing constrain the number of characters used, the audit trail will be repeated eventually. For instance, if the audit trail consisted only of 6 digits, the audit trail would be repeated every 1,000,000 pieces. If the machine processes less than 1,000,000 pieces each month, the user may want to restart the audit trail count each month. Then, care must be taken to make certain that pieces from each month are kept separated. The end result is that audit trails are unique for each piece during their month of processing. Different time periods and audit trails with different number of characters (or symbols) could also be used.

If the printer is downstream of the imager, an audit trail can still be used. Each piece could be assigned a unique audit trail that is sprayed after the imager. In addition, the audit trail can be added to the image file by modifying the image or by adding information to the data structure of the file. Printing the audit trail before imaging has the advantage that an image of the actual piece with its audit trail is captured. By printing after the piece is imaged, the system can make decisions as to whether or not an audit trail is printed. For instance, if the ballot is determined to be from a different election, the user may want to reject the piece without printing an audit trail. This option will not be possible if the first module is an audit trail printer (since the audit trail will be sprayed before the system has determined the election number of the piece). Other sensing devices can also be used to determine if an audit trail should be printed or not. For instance, a length sensor or a thickness detector which might detect double feeds (or other characteristics) can be used to determine whether or not an audit trail is sprayed. Having the printer downstream of the imager may offer advantages of allowing the system to be used for other purposes. For instance, an outgoing mail machine may require that a barcode is sprayed after the piece is imaged and the address is read. In this instance, having a printer downstream of the imager is required. A system can have printers both upstream and downstream to support multiple functions. A printer can be used to print the time and date of the piece before it is imaged, which validates when the piece was processed through the machine. However, having two printers adds cost to the system. In many cases it is desirable to adjust the actions of the machine so that only one printer is needed (e.g., print the audit trail after imaging for a machine that is processing ballots and outgoing mail).

For processing ballots, normal actions include extracting information from the ballot (e.g., reading barcode or barcodes, reading characters, reading symbols, detecting the presence of signatures or other marks, measuring length, measuring thickness, and/or measuring weight) and capturing and storing one or more images of the piece. The information extracted may be dependent upon other actions. For instance, if the piece is too thick (for example indicating the presence of more than one ballot or a piece other than a ballot or a contents in addition to ballot contents), the piece may not be imaged. Thickness may be checked by a micro-switch or sensor that is adjusted to the valid width of a ballot for example. Weights may be checked by incorporating an inline scale into the system. Pieces falling outside of a designated weight can be sent to a reject bin for example. In another instance, if the system reads an election number from a ballot that read result may indicate that a precinct number or other sorting parameter, such as county, state or voter identification number also must be read. In another instance, a unique identifier may be read first. Then, that identifier is checked against an 'approved' list. If the identifier is approved, additional processing is performed. However, if the identifier is not approved, other actions (such as signature detection) may not be performed. In addition, the operator may indicate that certain actions are to be performed (and others not performed) by issuing commands (e.g., entering information into a control computer) prior to running a set of mail pieces. In other embodiments, all information extraction actions may be performed regardless of the information extracted. While some extracted information may not be relevant in certain instances, a complete record of all the information can be stored for each ballot.

Zero, one or more images of the ballot may be stored. In many instances, an image of the ballot is useful for reference or manual verification. In addition, there may be different areas of the image that need to be stored separately. For instance, the entire ballot may be stored for archival purposes. The signature area may be extracted and stored separately so it can be automatically or manually processed offline. Preferably, the signature is saved at 300 dpi (i.e. photo quality). An illustrative signature resolution range is about 300 dpi to about 600 dpi. Check boxes may be stored separately so they can be automatically or manually processed offline. In addition, areas of the image may be stored with different image quality. For instance, signatures may be stored in grayscale that will allow additional processing to be performed on them. The entire ballot image may be stored only as a black-and-white compressed TIF image in order to keep the size of the resulting image file small (i.e., to conserve disk space on the storage device). Furthermore, the number of images may vary depending upon information extracted from the ballot or depending upon setup information input by an operator. In some instances, no image storage is required. For instance, if the election number is not valid for the current set of ballots, the piece may be rejected without capturing an image. Furthermore, in subsequent passes (e.g., re-running the mail for finer sortation levels), there may be no need to capture an image of the mail piece since an image of the mail piece was already captured.

Duplex reading may be employed wherein a camera processes the front and back side of a ballot in one pass. This allows coding of information on both sides of the piece. If one side of the piece should be blank, the duplex reading can be used to flag pieces with markings on both sides. Duplex reading can also be used to reject pieces wherein information on one side is missing, if both sides should have coding.

Another useful ballot-processing step is processing the signature. In some instances, detecting the presence/absence of the signature is sufficient. In other instances, verifying the signature against a signature-of-record is desirable. Handwriting-script recognition software can be used for this function. The signature may be concealed on the ballot by means of a flap. This flap can be removed or moved out of the way before the signature can be processed. Moving the flap can be a manual process performed before running the pieces on the system or an automatic process can be performed while the piece is in the system. It is also possible to detect a signature without removing the flap or an opaque window or area over the signature. Subtraction algorithms can be implemented to detect a signature disposed behind a substantially opaque area as viewed by the human eye.

Detecting the presence/absence of the signature (or verification of the signature) is an imperfect process. That is, there will be errors either in detecting a signature on a piece that does not have a signature (false positive) or not detecting a signature on a piece that has a signature (false negative). Signature detection can be done by looking for the presence/ absence of marks or dark areas in the signature area of the piece. If the number, size, or other characteristic of the marks exceeds a threshold, or if a sufficiently dark area is present, the piece is determined to have a signature. However, there may be marks in the signature area that are not from an actual signature (e.g., non-signature marks made by a person, marks/damage made by handling the ballot, portions of a covering flap that have not been removed but appear in the signature area). When detecting the presence/absence of the signature, it is normally desirable to err in the favor of false positives. Since pieces will normally go through a signature verification step (either manually or automatically); a missing signature will be detected at that time. Normally, it is easier to reject a piece that was previously accepted than to insert a piece that was previously rejected (e.g., a piece that had a signature but no signature was detected).

For this reason, using real-time, on-line signature verification to reject pieces may not be desirable, although it can be implemented in certain embodiments of the invention. For current state-of-the-art signature verification systems, 10-20% of the pieces containing valid signatures will be rejected to make certain invalid signatures are not accepted as verified. If the signature verification was used to reject pieces, 10-20% of the pieces (most with valid signatures) would be sent to a reject bin. Instead, it may be better to accept all pieces with a detected signature, then performing automatic or semi-automatic signature verification. If some pieces are rejected, those pieces could be reexamined (by image or by using the actual piece). In this process, a much smaller percentage of pieces will be rejected (typically less than 2%). To remove those pieces from the set of valid ballots, those pieces can be outsorted in a second pass or manually extracted. This method is usually preferable to rejecting 10-20% of the pieces and then reinserting those that are determined to have a valid signature.

In an illustrative embodiment of the invention, the presence of signatures is determined, after which the signature is verified against an existing signature or signatures. An audit trail may be generated that includes some or all of the following information: authorization and date/time stamp for each signature verification, review, and/or correction. Reports may also be generated on the number of signatures processed, number of batches processed, batches still needing processing, and other related information. The information available for report generation can continually be updated as signatures are verified so that a report generated will have up-to-the-minute information.

As noted above, signatures can be verified manually or electronically. Multiple workstations can be used simultaneously for review of signatures to accelerate the process. The workstations are functionally connected to a server to implement particular embodiments of the signature verification process as described.

The system may be set up to require multiple verifications for signatures (e.g., require two operators or more operators accept a signature). Supervisor ability to review and correct signature verification results with correct authorization can also be implemented.

Signature acceptance thresholds can be set as appropriate. These thresholds can be adjusted by a person authorized to do so, if necessary. The signature verifier program can be equipped with self-learning and intuitive thresholds capabilities that allow for defined levels of confidence in the verification of a valid signature.

According to an illustrative embodiment of the invention, the signature verification procedure is a two tiered, signature capture and verification system that couples the processes of both automated validation and imaged based operator review of a voter's signature.

One tier of the signature verification is automated when used with a sorting system. A present signature is captured, filtered, and automatically compared with the signature(s) of record. If accepted, the signature can be assigned a confidence level based on the quality of match to signatures(s) of record. Multiple signatures of record can improve the confidence level of a match. The confidence level can be adjusted by the election officials, or others authorized to do so, to meet a certain threshold before it is automatically accepted and verified.

If a signature is not accepted, it is flagged and sent for review to be examined by an operator using the image-based system.

One tier of the signature verification is an image-based system and is performed by a human operator. The live (present) signature is captured on a pass through the scanning system. In a particular embodiment of the invention, operators view the live signature along with signature(s) of record remotely.

An audit trail is created for both procedures and can be sorted and batched as required.

In an illustrative embodiment of the invention, Voter's envelopes with signatures that are automatically verified and meet a defined confidence level are identified and filed on a database with a record identifier including the confidence level attained. Voter's envelopes with signatures that are not automatically verified (rejected) are identified, for example as "For Operator Image-based Verification" and sent to a remote console for human comparison. The combined results of both the automated and operator image-based signature verification are stored in a database. The voter's envelopes with no signature or not accepted signatures are diverted out of the sort on the second pass through the sorting system. All voters' envelopes that have been signature verified are sorted to the pre-determined sort scheme (precinct) on the second pass.

The automatic signature verification threshold can be adjusted to accept or pass through to a remote image comparison. This allows the election officials to set levels of automated confidence thresholds.

In an illustrative embodiment of the invention, the method includes the following steps: Operators will log into workstations.

- Operators select the election that they want to verify and run the signature comparator program
- The remote workstations will then receive signature images from unprocessed batches for the selected election from the server.
- The operators view each voter's signature(s), determine if a signature is verified (yes, no, unknown), and enter the determination.
- A log file is created of each decision the operators make.
- When the operators have completed a batch, the batch, along with results of the signature verification, are returned to the server.
- The signature comparator program can automatically obtain the next available batch.

Once all printing, information gathering, and image storage has been performed, the system must determine into which bin the piece goes. The system should have one or more reject bins. Reasons for rejects can include: wrong length (too long or too short), wrong thickness (too thin or too fat), wrong weight, double feed, printer error, image capture failure, read error, no code read, non-approved code read, no election number read, election number is not correct, no signature detected, no signature verified, etc. Rejects can be sent to separate reject bins or some reject bins may be combined (e.g., length, thickness, and double feeds can all go into a single bin). If a piece is not rejected, it can be sent to a sort bin based on information extracted from the ballot (perhaps combined with stored information). For instance, a precinct number or other indicator could be printed on the ballot and used for sorting. Or perhaps a code used to identify a voter is used to look up a stored precinct number. In other embodiments, precinct numbers may not be used at all. Instead, other sorting possibilities include: sorting based on the result of a barcode, symbol, or OCR read result, based on the result of a barcode, symbol, or OCR read result combined with stored data, based on time of processing, based on election number (if multiple elections are processed simultaneously), based on the number of items in a bin, based on the accept/reject criteria, or based on some combination of the above items. Once the bin has been determined, the piece can be mechanically directed to that bin and the destination bin information can be added to that piece's information record. It is noted that in addition to pieces being sorted into bins, they can be transported to other types of receptacles, or to designated areas or persons.

Most election systems want to keep detailed accounts of information about each piece. Audit records containing information about each piece can be stored. Note: the term 'audit trail' is often used to describe both the printing that occurs and the data record that is stored with each piece. To be clear, the term 'audit record' is used to describe the information and 'audit trail' to describe the printing. The audit record can contain any information that the machine has about the piece. The user may prefer that only information relevant to their process is stored. A typical set of information stored in an audit trail file is as follows:

6-digit sequence number printed on piece.
Barcode read.
Bin Number.
Election Number.
Approved/NOT Approved flag (1 or 0)
Delivered/Nixie flag (1 or 0)
Signature Locate flag (1 or 0)
Signature Stored flag (1 or 0)
Image file name.
Signature file name.
Time stamp of piece entered.

Each piece in a batch can have the information, such as that described above, stored in a batch. In one embodiment of the invention, the information is stored in a comma-separated ASCII text file with each line containing information about a single piece.

The audit record information can be output at any time, either during processing, or when there is a stop in the processing. The audit information can be output into computer memory, files, or stored in a database. Furthermore, the audit information may be organized by job or by batch. In one embodiment, a batch is formed for each output bin. As pieces are placed into that bin, the information about that piece is added to the batch for that bin. When that batch is complete, all the data relevant to that batch is output into a single audit record file.

Batches are useful to divide a large set of ballots into manageable portions. For instance, if the ballots are divided into batches of 300 pieces, and the batches are labeled and stored separately, a user can quickly locate a piece if they know the batch number. That is, the user will know that a piece is located within a set of 300 pieces instead of the set of all accepted pieces. The system may assist the user into forming batches by letting the operator know when a batch is complete. The system may also automatically switch bins when a batch is full (so that a bin contains at most a single batch). Or the system may stop the feeder or the transport when a batch is full. It may not be critical that a batch contains exactly a certain number (such as 300) of pieces, for instance, having a batch that contains 312 pieces may also be fine. Allowing batches to exceed their designated size is useful if only one bin is assigned to each batch. For instance, if a bin had 299 pieces with a designated batch size of 300, and the next three pieces run down the system were destined for that batch/bin. Once the first piece of that set goes into that batch, the batch has achieved its designated size. However, those other two pieces are still in the machine track and may be fully processed and ready to be accepted into that bin. The system could send those pieces to a reject bin to avoid exceeding the designated batch size. The machine can then continue functioning, rather than shutting down to deal with the excess pieces. However, if those pieces are rejected, they will need to be reprocessed. Another approach would be to place those pieces in the correct accept bin and let the designated batch size be exceeded. The operator is notified and the feeder can be turned off (manually or automatically), so that the designated batch size is not exceeded excessively. Once the operator has dealt with the completed batch (e.g., removed the batch from the machine or perhaps simply marked the end of the batch), a new logical batch is created for that bin, and the operator can resume the processing.

When the sorting information about a piece is known (e.g., the accept/reject status and any other sorting information such as precinct number of the piece is known), the piece will normally be sent to a specified bin. The bin will be determined by using a sort plan. For instance, the sort plan may indicate that rejects due to no-valid approval go to bin 1, rejects due to wrong election number go to bin 2, and rejects due to no signature present go to bin 3. In addition, the sort plan may indicate that pieces that are accepted and have precincts ranging from 1-100 go into bin 4, precincts ranging from 101-200 go into bin 5, etc. The sort plan that assigns pieces to bins based on the piece sorting information can be set up by an operator before the pieces are run. The setup can be done manually (where the operator enters all the sort plan information) or automatically (where a computer generates a sort plan based on supplied information). In addition, the sort plan can be dynamic to use overflow bins. That is, if a bin is full (or the batch in that bin is complete), the sort plan can direct the mail to another bin automatically. Sorting can be based on information contained on the piece or by external information.

The system is preferably equipped with an on demand or automatic tray tag printer. In an illustrative embodiment of the invention, there is a button, or other device, located on each bin that allows the operator to request a tray tag whenever the tray is filled. A thermal printer can be included, for example one printer for every 16 bins.

When the operator is processing, the operator can enter information that may be used to affect the processing action or store information in the audit record or both. In one embodiment, before starting the processing, the operator enters the appropriate election number and an approval file. The election number is compared against any election number extracted from the piece. If the election number does not match, the piece is rejected. The approval file is a list of valid voters for the election. If information is extracted from the piece (e.g., a barcode), and that information does not have a match to the approval file, the piece is rejected. Similarly, multiple approval files or rejection files (if information matches a rejection file, the piece is rejected) could be used.

Furthermore, information entered by the operator can be stored in the audit record. For instance, the operator could enter his/her name so that the audit record would list the name of the person who processed the ballots. In one embodiment, the approval file can also contain the precinct number. That is, once information is extracted from the piece and compared to the approval file, the precinct of that piece can be determined from the approval file (e.g., each line in the approval file contains a value representing the barcode on the piece and a precinct number). The precinct number can be stored in the audit record file and can be used to determine the sort bin for the piece.

It is often useful to have the machine perform multiple operations. For instance, after the first pass, the operators may want to sort bins into finer sortation levels. The first pass may put pieces from several precincts together. Finer sortations are often needed if there are more precincts than bins. The operator may want to perform additional passes to further divide the ballots (such as into individual precincts). The additional passes may have different operations to be performed than during the first pass. In one embodiment, no printing or image storage is performed during additional passes (since a unique audit trail number has already been applied and images for the piece have already been captured). Instead, the system will further sort the pieces and may create new audit record files (since the pieces may now be placed in new batches). Furthermore, the system may check the pieces against a new approval file and reject pieces for other criteria. For instance, a new approval file may contain information about whether a signature was verified. That information may be used to reject non-verified signatures. In another example, multiple ballots may be found for a single voter and the system would reject multiple ballots. The approval file mentioned in this patent does not need to be an 'actual file'. The approval information could instead be accessed as a real-time database access.

The ballot-processing machine can also be configured with components to be used for other processes. In one embodiment, outgoing mail can be processed by reading the address and applying a barcode or simply by reading the barcode. In certain applications (such as elections), it may be desirable to capture images and other information of each outbound piece. If that information is stored, the users can confirm that pieces have successfully been printed and are ready for further processing, such as mailing. It can also provide accurate counts of the number of pieces ready to be mailed or otherwise processed further.

Another application that can be performed on the same machine is processing returned mail. When mailings are sent out, some of the pieces may be returned for various reasons (for instance, an incorrect address). The users may want to keep track of which mail was returned and take any necessary actions (such as sending out a new ballot). In one embodiment, the returned mail is run down the machine. Audit trails are sprayed on the mail piece. An image of the mail piece is captured and stored. Information about the mail piece is extracted (such as a barcode that is read). In a similar manner as above, the returned mail can be stored in batches and audit record information can be stored for each piece. For returned mail, the batches may be formed by processing order. For instance, the first 300 pieces go into bin 1; the second 300 pieces go into bin 2, etc. This keeps the returned mail ordered by printed audit trail number.

Ballots are not always designed to be run through a machine, since the original ballot designs were for manual processing. As such, the ballots may have physical characteristics that make it difficult to run them on automated machinery in a particular orientation. For instance, after removing the signature flap, a ballot may have a flimsy piece of paper on the leading edge of the piece. This may cause problems for automated equipment. One possible solution is to rotate the piece so the flimsy piece of paper is on the trailing edge of the piece which allows the piece to be processed through a machine. However, if no changes were made to the system and the piece is running upside down, the printing will be upside down and the captured image will be upside down. To overcome this, the system can be set up so that when pieces are run upside down, the printing is reversed and upside down and the image is rotated before capture and/or processing. This allows these pieces to be processed through the machine, but keeps the printing and image capture in the same manner as pieces run in a right-side up orientation.

Illustrative Example of Ballot Processing Method

Overview: Data capture is achieved on a first pass, diverting all unaccepted envelopes to either a reject bin or a bin designated for envelopes with a particular reason for rejection. A second pass through the apparatus allows sorting to split precincts as well as any further sorting desired. Any number of bins can be used for any sort configuration.

In this illustrative embodiment of the invention, the first pass captures all data, diverts unacceptable envelopes into defined bins, and sorts acceptable envelopes to a predetermined level. The second pass sorts all envelopes to multiple precinct levels and diverts all envelopes with unacceptable signatures.

In this illustrative embodiment of the invention, before being presented to the sorting apparatus, envelopes are sorted into groups, for example:

Envelopes that have been returned by the voter and orientated for processing.

Envelopes that have been returned by the Post Office as 'Undeliverable"

Other mail that is not related to voting.

Also before being presented to the sorting apparatus, the "security flaps" on the envelopes are removed. In this embodiment, removal is performed manually, but may be accomplished using a machine designed for the task.

The returned envelopes that have been orientated and have had the security flap removed are fed into the sorting apparatus where they are singulated for further processing. Prior to initiating the sorting process an election code is input into the system computer. The election code will generally consist of four characters (1-2 letters and 2-3 digits, election type, month, and 2-digit year).

Envelopes Returned by Voter

A unique time/date and sequence number (preferably six-digit) is printed or otherwise placed on the envelopes. This can be performed before or after image scanning but is preferably done before scanning so the envelope image will contain the unique identifier before being captured and stored or otherwise utilized.

A pre-existing identifier, such as a pre-printed barcode, is contained on the envelope. The term "barcode" will be used in this example, but can be another suitable type of identifier. The pre-printed barcode is read by a scanner. The read barcode is checked against an approved data list. In this example the list contains all approved voter barcodes and the district/precinct numbers associated with that voter, but can contain alternative or additional information. If a barcode read on an envelope is not on the list, the system will consider that piece to be "not approved" and will direct it to a reject bin, or other receptacle or path. (As used herein, "bin" has a broad meaning and includes all receptacles and paths.) The approved data list includes the precinct number for each pre-printed barcode (usually Code 128, but may be Code 39 or other barcode size/format). If no barcode is read, the piece will be directed to a reject bin.

An image of the envelope (preferably the entire front side) is captured. The envelope image is stored in a binary (black and white) TIFF format file or other compatible file or format. The image files are stored in a directory on the system computer, preferably under date and time as part of the path. The sequence number is included and is part of the file name (e.g., an image captured on Aug. 14, 2006 at 9:45 am with a sequence number of 1234 will be stored under C:\ImageStorage\081406\09\001234.tif).

It is determined whether a signature is present in the image. If no signature is present, the envelope is sent to a "no signature" bin. An image of the signature area can be captured and stored as described below (even though no signature was detected). If a signature is present, the envelope is processed further by the system. The signature image is stored, preferably in a gray scale image stored in a JPEG format or other suitable format. This image is stored in the same location as the address image, but the file name includes "sig" or other signature identifier in front (e.g., C:\ImageStorage\081406\09\sig_001234.jpg).

Various sorting plans are used. In this illustrative embodiment of the invention, it is determined if the envelope contains more or less than expected. If the envelope thickness does not fall within specifications (indicating the contents are not complete or there are additional contents), the envelope is diverted to a specified reject bin. If the barcode is not read; or the piece is rejected for mechanical reasons; or no image is captured; the piece is placed into a designated reject bin. These reject bins are generally configured by the operator at time of set-up. Set-ups can be stored and recalled without having to reconfigure each time. If the barcode is read, but the barcode is not approved, the envelope is placed into a "not approved" bin. If the barcode is approved, but no signature is detected, the envelope is placed into a "no signature" bin. If the envelope has an approved barcode and a signature is detected, the piece is considered "accepted" or "acceptable". Accepted envelopes are sorted according to a predetermined scheme. For example, an envelope can be placed into a bin based on its district number. The district number is supplied by the election office and included in the preprinted barcode.

Accepted envelopes are placed in bins of approximately 300 pieces or another selected quantity threshold. If a bin contains 300 envelopes, the feeder shuts off automatically. (An optional overflow can be implemented that would continue to sort to a second bin without shutting down the machine). A message appears on the system screen indicating which bin (or bins) is full. The operator can then clear the bin and then enter the information that the full bins have been cleared, for example by using a mouse or otherwise keying information into the computer. Sensors or other devices can also be employed to automatically provide the system with information on when a bin is emptied.

Information is stored for each completed batch of approximately 300 pieces (as well as remaining batches of less than 300 when the processing is done). The exact batch number is adjustable in the configuration file. Information for each envelope can include for example: digit sequence number (preferably 6-digit), the barcode read, bin number, election number, approved/not approved flag, image file name, signature file name, and time/date stamp of the piece. As each batch is completed, the information is appended to an ASCII text file or other suitable file type, for that particular processing run. This information is stored on the system computer. In addition, a file for each batch containing only the barcode number for each envelope in the batch is created. The information described above constitutes the audit trail for each envelope. In a particular embodiment, no other information is stored. Also in a particular embodiment of the invention, the information is created for each of the bins except for the reject bin. The reject bin has a log file for each envelope. That is, each piece contains the sequence number, the barcode read (if any), election number read (if any), bin number, and the reason for the rejection (e.g., no image, no barcode, non-matching election code, etc.). Generally, no image is saved for these rejected pieces. These pieces can be rerun as desired. It may be necessary to cover up the date/time and sequence number to effectuate further processing.

The "no signature" and "not approved" bins also have batch sizes of approximately 300 or other designated threshold quantity. When processing is complete; the operator inputs into the system that the job is complete, such as by use of a mouse or other input method. The system indicates that the batch data for that job is available for transfer.

A second pass of qualified voter's envelopes can then be made. These envelopes can be re-fed into the system for finer pre-determined sorts (precinct) and checks against acceptance files. At the end of this processing, a bin count is available and an audit trail is available. The election code is preferably read. The audit trail should have an identical format to the ballot mail.

Envelopes Returned by Post Office

Envelopes designated as "non-delivered mail", i.e. that have been returned as "undeliverable" by the Post Office are processed similarly to the above process except that no signature check is made and no signature image is saved. An operator can input data into the computer to indicate that this run is "nixie" (undelivered) ballot mail.

A time/date and 6-digit sequence number is printed on the envelope. The envelope image is captured. No sorting is done in this particular embodiment. Instead, envelopes are placed in bins in sequence-number order. When a bin has approximately 300 pieces (or other designated amount), there is an option to stop the machine or increment to the next bin. When all bins are full, the operator can be notified to empty the bins. An audit trail text file is created from barcode data obtained during the process. This file will have an identical format to the ballot mail. If the barcode is not read or the envelope is not accepted, it is diverted to a reject bin.

Once the ballot envelopes have proceeded through the process described above, the accepted envelopes are slit, or otherwise opened, and the contents removed, either by hand or by an apparatus designed for the task. Various high-speed mail openers and extractors are commercially available and may be used or modified to be used for the task. The ballots can then be tallied either by hand or electronically. Depending on the ballot type, tallying may include scanning or otherwise detecting markings or removed/non-removed chads from the ballots.

In a preferred embodiment, the signature location for each ballot job is in the same location. The system however can be modified to handle changes in the signature location and/or style of envelope.

In an illustrative embodiment of the invention, the date/time and sequence number printing is performed with a Videojet PC-70 printer. This is a high-speed printer designed for use by the USPS mail. The printer works well on non-glossy paper stock.

In an illustrative embodiment of the invention, the ballot envelope sorting apparatus handles items that are about 4.75 inches high by about 11 inches long, about 0.056 inches thick and weighing about 0.055 pounds, which is typically the size of advance ballot envelopes. In a further illustrative embodiment of the invention the apparatus handles items that are about 5 inches high by about 9.5 inches long, about 0.048 inches thick and weighing about 0.0528 pounds, which is typically the size of mail-in ballot envelopes. Illustrative dimension ranges include: about 4.75-5 inches high; about 9.5-11 inches long; about 0.04-0.06 inches thick; and about 0.050-0.057 pounds.

FIG. 1 is a flow chart of the processing of a single ballot according to an illustrative embodiment of the invention. A ballot enters a stream of items in a sorting apparatus in block 102. The ballot is detected by one or more sensors in block 104. The sensors sense a particular ballot dimension or dimensions, such the height and length of the ballot face or the thickness of the ballot. In step 106, a software program allows the sensed dimensions to be compared to threshold dimensions or ranges of dimension. If the dimensions are within the designated range, below the threshold, or above the threshold as programmed, the item is considered to be valid. If the piece is determined to be of invalid dimensions, it is sent to a reject bin in step 108. If the item is determined to be of valid dimensions, an audit trail is printed on the piece in step 110. The audit trail may include information such as a date/time stamp, a sequential number, information obtained from a preprinted barcode or other identifier, etc.

In step 112 an image or images of the ballot are captured and stored. The entire face of the ballot may be captured and stored, and-or individual portions, such as the signature area. Also in step 112, the presence of a signature is detected. The captured image or images are then evaluated in steps 114, 118, 122 and 126, and further decisions are made based on the evaluations. In step 114, it is determined whether the identifier, such as a pre-printed barcode, is valid. If not, it is sent to a "no-valid-identifier" bin in step 116. This may be preferably to sending it to a final reject bin, because further evaluation of the ballot may be desired, which can be performed either manually or automatically, such as by a second pass through the apparatus, or through another system.

In step 118 it is determined whether the election number on the ballot is valid. Generally, before the process is started, the correct election number will be entered into the system. The election number on each ballot can then be compared to the entered election number. If the election number is not valid, i.e. is not the same as the entered election number, the ballot is sent to a "no-valid-election number" bin in step 120, and can be further processed if desired.

In step 122, it is determined whether a signature is present. Generally, the determination will be made based on the amount of markings in a designated signature area. If the number of markings is above the threshold number, the ballot is considered to have a signature. If the number of markings is less than the threshold number, the item is sent to a "no-signature-present" bin in step 124, and will likely be processed further to determine whether there is actually a signature on the ballot.

The signatures present are then checked to determine whether they are valid in step 126. This can be accomplished by comparing the signatures to one or more existing signatures contained in a database for comparison purposed. If the signature is not valid the item will be sent to a "no-valid-signature" bin in step 128. The signature will then likely be evaluated manually.

In step 130, the precinct associated with the ballot is determined. This information may be contained for example within a preexisting barcode on the ballot. The ballot will then be directed to the appropriate bin in step 132.

In step 134, information is added to the audit trail, such as bin number and various data obtained from prior steps in the process. This part of the process is then complete in step 136. As noted above, additional processing, such as of items sent to rejection bins, can be performed. Also, batches of items from a particular precinct can be sorted to finer parameters.

Figure 2:
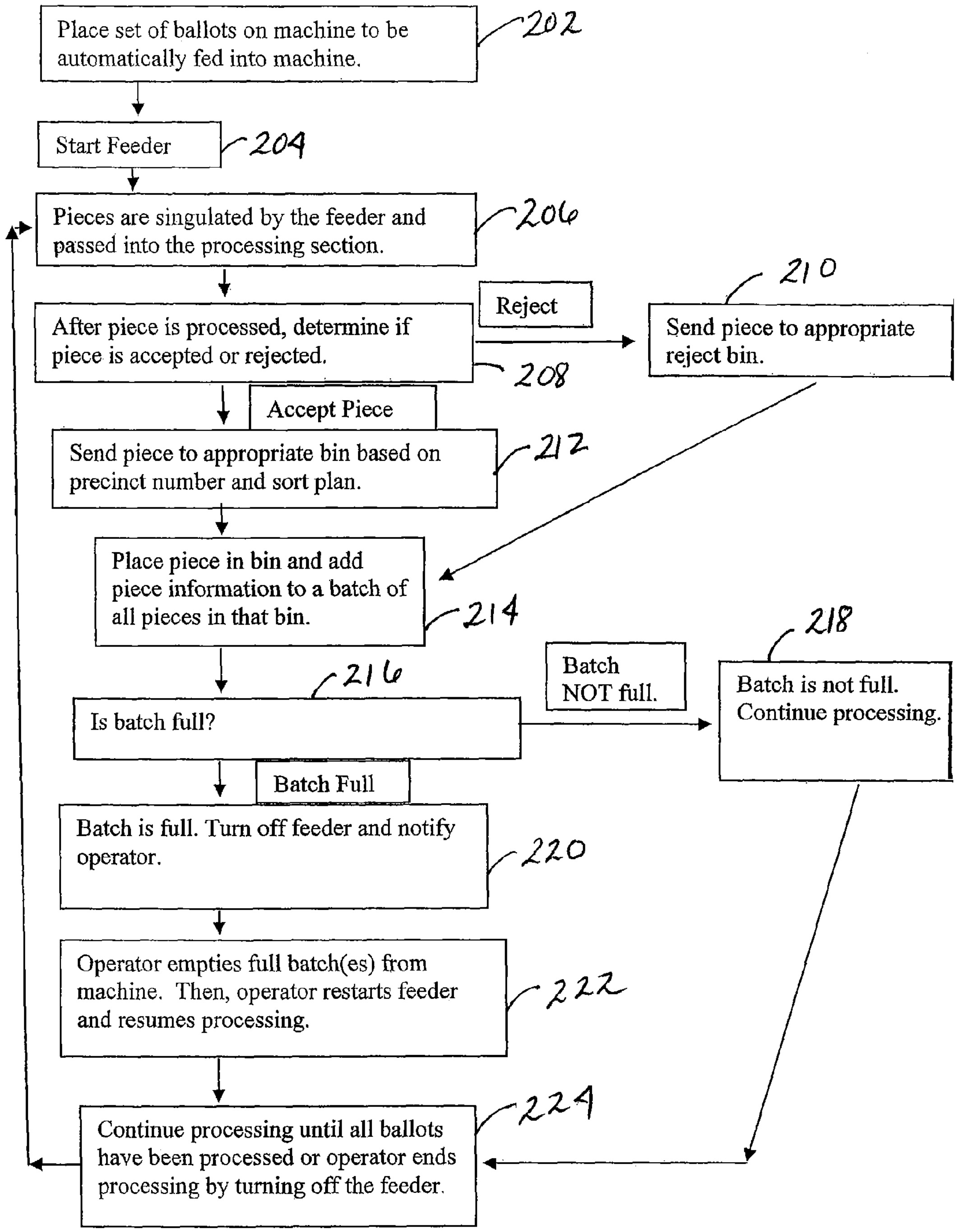
FIG. 2 is a flow chart of processing a set of ballots according to an illustrative embodiment of the invention.

FIG. 2 depicts the processing of a group of ballots according to an illustrative embodiment of the invention. In step 202 ballots are placed in a system to be initially processed by a feeder in step 204. The feeder singulates the ballots in step 206. Various devices can be incorporated into the machine to singulate the ballots, often referred to as "singulators." As described in FIG. 1, sensors, scanners and software are used to automatically determine whether ballots should be rejected or sorted by precinct or other sorting parameter. This determination is made in step 208. If it is determined that the piece should be rejected it is sent to an appropriate reject bin in step 210. If it is not rejected, in step 212 it is sent to a bin based on precinct number any/or other sort plan implemented by the software or user input into the software. In step 214, whether the ballot is sent to a reject bin or another bin, information on its routing is added to an audit trail for that piece.

In step 216 it is determined whether any batches are full. This is an ongoing process. If batches are not full, the process continues as shown in block 218. If a batch is full, then in step 220 the feeder is turned off and an operator can be notified. This can occur automatically, or an operator can be alerted and manually turn off the machine to replace or empty the bin as in step 222, or a combination or procedures can be used. The operator then restarts the machine in step 222 and processing resumes. Processing can also resume automatically once a bin is emptied and/or replaced, but generally manual restarts will be preferable for better control of the process.

Once all ballots are processed the operator can turn off the feeder/system in step 224, or it can be configured to stop automatically.

Figure 3:
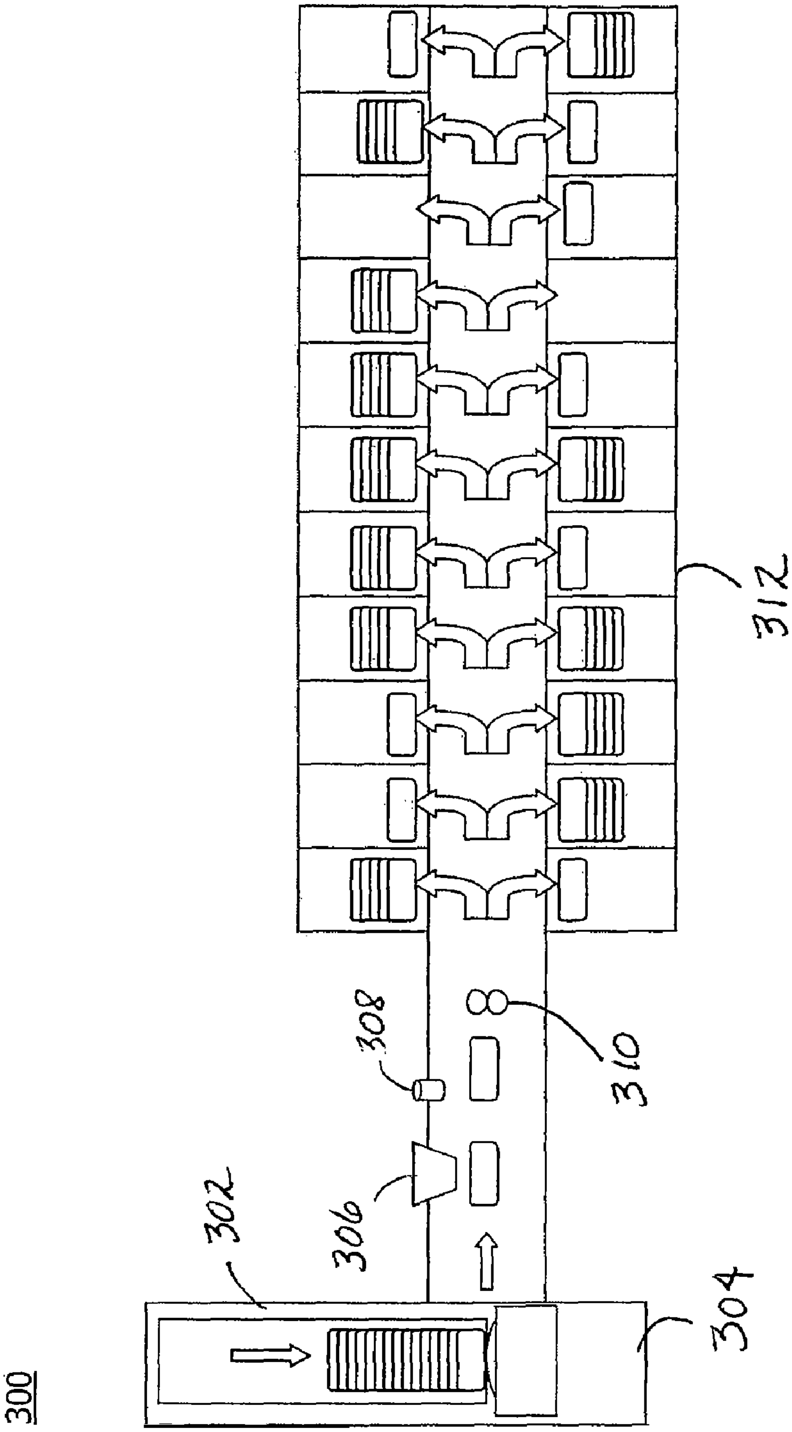
FIG. 3 depicts a ballot sorting apparatus according to an illustrative embodiment of the invention.

FIG. 3 depicts a ballot machine 300 according to an illustrative embodiment of the invention. A feeder 302 operates to feed ballots or documents into the machine. Feeder 302 will typically include a singulator to ensure that items are fed into the machine one by one. An operator console area 304 contains a monitor, data entry device such as a keyboard and/or mouse, and on/off controls for the sorting apparatus and/or sections of it, such as the feeder or transport portion. This equipment is functionally connected to a computer, which may be further connected to a server. The item progresses through the machine, typically on a conveyor belt and passes a scanner 306, such as a camera. The scanner captures data contained on the item, such as from a barcode. A printer 308 prints an identifier on the item, such as a time/date and sequence number. The printing can occur before or after the scanning, so the location of the scanner 306 and printer 308 may be reversed. One or more dimension detection devices 310 is also positioned along the path of the item to sense or otherwise determine item dimensions so they can be compared against valid parameters. Detection devices 310 can also be positioned before or after scanner 306 and printer 308. Items are directed to one of a plurality of sort bins 312 based on sorting parameters and plans.

An illustrative sorting machine is the Tritek® 88-5 sorter, which is a high-speed machine capable of processing 30,000 pieces per hour. The actually speed when implemented to sort ballots may vary depending, at least in part, on the verification steps included. The 88-5 includes a vacuum feeder, such as described in U.S. Pat. No. 5,398,922. Other feeder types are within the spirit and scope of the invention. The feeder system will generally contain a conveyor system station for initially receiving a plurality of individual items, a singulation station to ensure items are transported through the system one by one, and a delivery section to move the items toward a transport section. The transport section of the sorting apparatus may be of the type described in U.S. Pat. No. 5,226,547. Generally, the system includes a conveyor or other means for moving items toward sorting bins, various belts rollers for items being transport in an upright or non-horizontal manner, and diverters or similar devices to direct the items to appropriate bins. Ballots may also be transported in flat on the conveyor.

Figure 4:
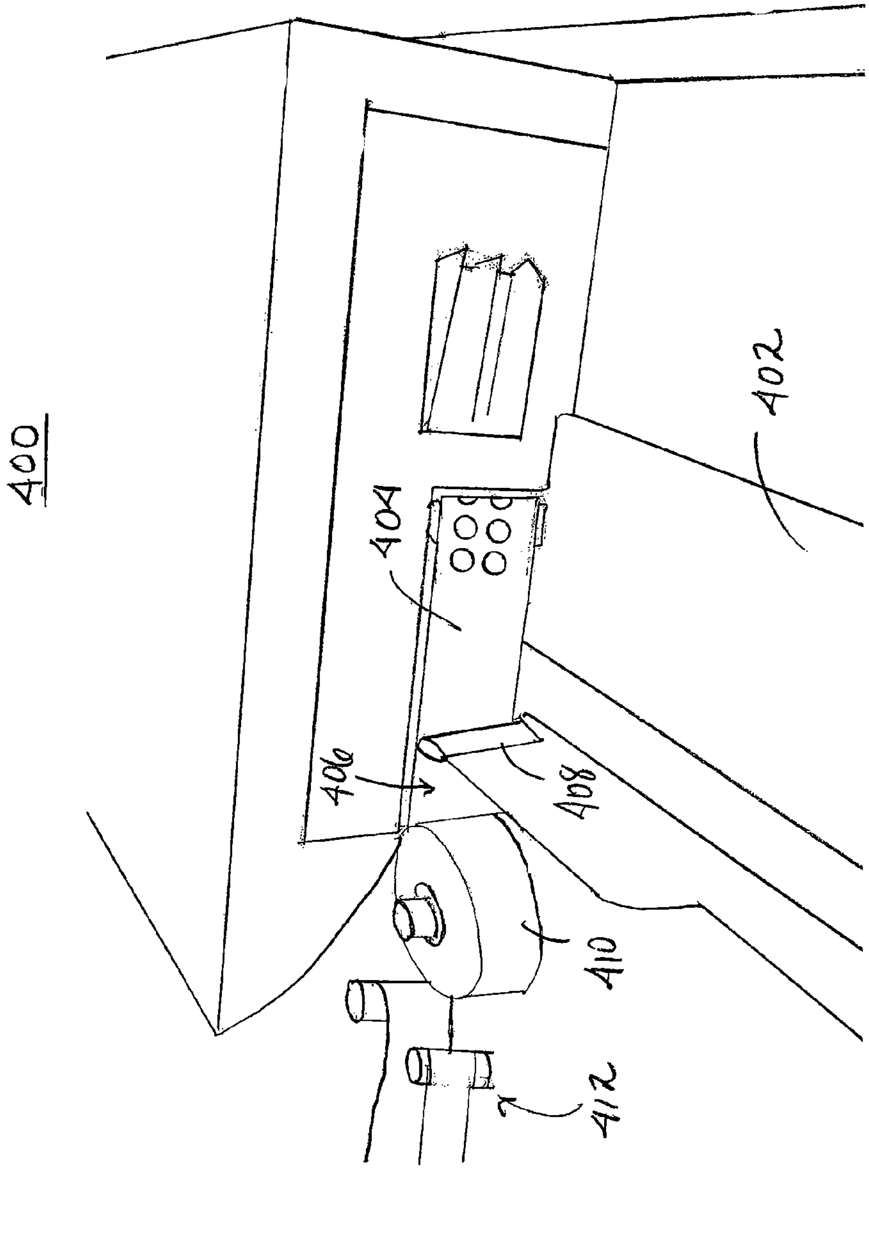
FIG. 4 depicts a feeder apparatus according to an illustrative embodiment of the invention.

A feeder 400 according to an illustrative embodiment of the invention is depicted in FIG. 4. It includes a transport belt 402 to transport items toward vacuum feeder 404. A singulation device 406, which in this embodiment includes a flexible loop 408 and a roller 410. After items are singulated they proceed into a transport system, the beginning of which is shown at 412. The feeder and its associated singulator are of particular importance to automation of ballot envelope processing. Envelopes can be difficult to process, especially when a flap has been removed for the purpose of viewing a signature. The purpose of a singulator is to ensure that envelopes proceed one by one into the transport and sorting area of the ballot sorting apparatus. When a flap has been removed, a feeder could process the piece as though it were more than one item, because of multiple edges created at the site of the removed flap. This will generally cause tearing of the piece as the singulator attempts to separate what it perceives to be two or more items. The configuration shown in FIG. 4, which includes a flexible loop, inhibits tearing of the envelopes. In the illustrative embodiment shown in FIG. 4, the flexible loop is disposed downstream from the feeder. The flexible loop holds back a consecutive item, to singulate it from the next item. In this illustrative embodiment, the flexible loop is followed by a friction wheel, which also serves facilitate singulation of items.

The ballot processing system works in conjunction with OCR and processing software to carry out the processes described herein. The software generally governs the scanning, printing and execution of the sort plans.

Embodiments of the invention include the processing and sorting methods and apparatus capable of carrying out the methods.

While the invention has been described by illustrative embodiments, additional advantages and modifications will occur to those skilled in the art. Therefore, the invention in its broader aspects is not limited to specific details shown and described herein. Modifications, for example, to the algorithms, and apparatus may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. An automated method for processing vote-by-mail ballot envelopes having an existing first identifier and an election code containing a precinct designation, the method comprising:

entering an election code into a computer;

feeding ballot envelopes into a sorting apparatus functionally connected to the computer;

placing a second identifier on the ballot envelopes as they are transported through the apparatus;

reading at least a portion of the existing identifier on the ballot envelope;

providing a first approved data list containing approved voter identifier and associated precinct numbers;

comparing read existing identifiers against the first approved data list;

rejecting ballots with no or invalid existing first identifiers;

reading the election code on the ballot envelopes;

rejecting ballot envelopes with no or invalid election codes and sending those ballot envelopes to a reject bin;

electronically capturing one or more ballot envelope images;

storing the image(s) in an electronic file;

electronically determining whether a signature is present in at least one of the one or more images by looking for the presence/absence of dark areas in the signature area of the ballot that exceed an acceptance threshold;

directing ballot envelopes without signatures to a rejection bin;

automatically sorting non-rejected ballot envelopes into a bin designated for the precinct associated with the ballot envelope;

selecting a ballot envelope quantity threshold for each bin;

ceasing sorting into a bin when the ballot envelope quantity threshold is reached except for ballot envelopes already in process in apparatus;

electronically storing an audit trail for each ballot envelope sorted including in the audit trail a batch with which the ballot envelope is associated; and employing duplex reading wherein a camera processes the front and back side of the ballot in one pass to allow coding of information on both sides.

2. The method of claim 1 wherein rejecting ballots with no or invalid existing first identifiers comprises:

rejecting ballot envelopes with invalid existing identifiers and sending those ballot envelopes to a “not approved” bin; and rejecting ballot envelopes without existing identifiers and sending those ballot envelopes to a reject bin.

3. The method of claim 1 further comprising:

comparing each signature with one or more signatures of record contained in an electronic database.

4. The method of claim 3 wherein the signatures are compared visually on one or more remote terminals displaying the read signature and signatures of record.

5. The method of claim 3 wherein the signatures are compared electronically to the signatures of record.

6. The method of claim 1 further comprising requesting a bin tag when a bin is full.

7. The method of claim 1 wherein the second identifier includes the date and time of identifier placement on the ballot envelope and a sequence number.

8. The method of claim 1 comprising capturing the image as two or more image areas and storing the areas under different file names, wherein one of the image areas contains the signature.

9. The method of claim 1 wherein the audit trail includes a sequence number, barcode, bin number, image file number, signature file name, and ballot time/date stamp for each ballot envelope in one or more full batches.

10. The method of claim 9 wherein the stored audit trail is appended to a text file created from the existing first identifier.

11. The method of claim 1 comprising automatically creating an electronic file containing a list of rejected ballot envelopes and the associated reason for rejection.

12. The method of claim 1 comprising re-feeding processed ballot envelopes into the sorting system and performing further sorting to finer pre-determined sorts and further checking against a second approved data list.

13. The method of claim 1 further comprising:

providing an acceptable ballot envelope thickness range based on ballot envelope content;

measuring the thickness of the ballot envelopes and comparing the measured thickness to the acceptable thickness range;

rejecting ballot envelopes having thicknesses that are not within the acceptable ballot thickness range;

further processing ballot envelopes that are within the acceptable thickness range.

14. The method of claim 1 further comprising:

providing an acceptable ballot envelope weight range;

weighing the ballot envelopes inline and comparing the weight to the acceptable weight range;

rejecting ballot envelopes having weights that are not within the acceptable ballot weight range;

further processing ballot envelopes that are within the acceptable weight range.

15. The method of claim 1 further comprising:

orienting the ballot envelopes in a manner compatible with mechanically processing the envelopes;

automatically rotating the ballot envelope image for correct electronic image processing.

16. The method of claim 1 further comprising:

orienting the ballot envelopes in a manner compatible with mechanically processing the envelopes;

automatically placing the second identifier on the ballot envelope in a desired orientation regardless of the ballot envelope orientation.

17. The method of claim 1 wherein electronically determining whether a signature is present in at least one of the one or more images is accomplished by:

providing a signature verification threshold number and/or size of marks in a signature area;

comparing the number and/or size of marks in the area to the threshold number;

designating the signature valid if the number and/or size of marks is greater than the threshold number and-or size.

18. The method of claim 1 wherein signatures are detected through an area that is substantially opaque to the human eye.

19. A computer readable medium programmed to carry out the method of claim 1.

20. A computer system configured to carry out the method of claim 1.

21. A vote-by-mail ballot envelope processing apparatus configured to process ballot envelopes according to the method of claim 1.

22. The apparatus of claim 21 comprising:

a feeder having a singulator, wherein the singulator has a flexible loop to separate envelopes to be processed one by one.

23. The apparatus of claim 1 comprising for ballots with codes on both sides:

flagging ballots if one side of the ballot is blank.

24. The apparatus of claim 5 comprising:

saving the signature in a resolution range of about 300 dpi to about 600 dpi.

* * * * *